United States Patent

Roeder et al.

[15] 3,638,864

[45] Feb. 1, 1972

[54] TORCH HOLDING LATCHING ARRANGEMENT

[72] Inventors: Georg Roeder, Frankfurt/Main; Heinz Ginsberg, Ruppertshain/Taunus, both of Germany

[73] Assignee: Messer Griesheim GmbH, Frankfurt/Main, Germany

[22] Filed: May 8, 1970

[21] Appl. No.: 35,845

[30] Foreign Application Priority Data

June 6, 1969 Germany .................. P 19 28 851.8

[52] U.S. Cl. .................. 239/280.5, 239/283, 239/424.5, 239/587, 239/600, 248/75
[51] Int. Cl. ........................................... B05b 15/06
[58] Field of Search .............. 239/282, 283, 280, 280.5, 587; 248/282, 284, 75, 419.5, 424.5

[56] References Cited

UNITED STATES PATENTS

| 2,397,349 | 3/1946 | Hartung | 239/424.5 |
| 2,623,576 | 12/1952 | DeJong et al. | 239/424.5 |
| 2,521,490 | 9/1950 | Strauss | 239/394 |
| 2,464,958 | 3/1949 | Allen | 248/75 |
| 2,605,136 | 7/1952 | Kline et al. | 239/282 |
| 3,377,028 | 4/1968 | Bruggeman | 239/394 |

FOREIGN PATENTS OR APPLICATIONS

| 1,188,121 | 3/1959 | France | 239/283 |

*Primary Examiner*—Lloyd L. King
*Attorney*—Ernest F. Marmorek

[57] ABSTRACT

A holding arrangement for multiple machine cutting torches has a holder for each torch that includes a sleeve receiving the body of the torch; and latching means are provided between the holder and the torch body releasably latching the torch in an operating position.

6 Claims, 1 Drawing Figure

PATENTED FEB 1 1972
3,638,864
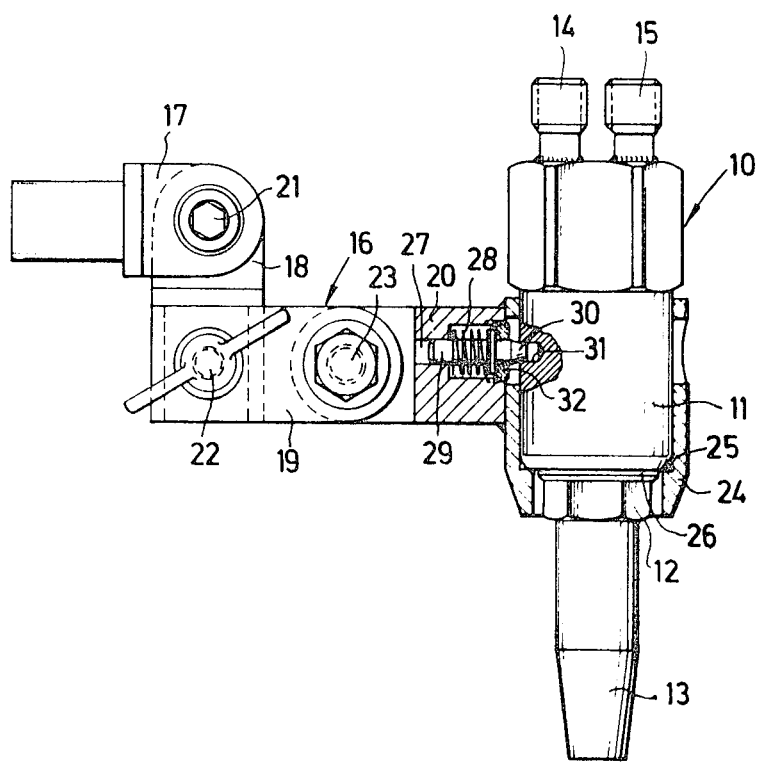
INVENTORS
Georg Roeder and
BY Heinz Ginsberg,
Their Attorney.

3,638,864

TORCH HOLDING LATCHING ARRANGEMENT

BACKGROUND OF THE INVENTION

The invention relates to an arrangement for holding torches, and relates more particularly to such an arrangement for holding multiple machine torches.

Machine torches are used, among other uses, for repairing sheet metal pieces to be seam welded. In this connection, reference is had to the copending application of Siegfried Hahne, Ser. No. 14,401, filed Feb. 26, 1970, assigned to the assignee of the instant application.

For a K-welding seam preparation, for example, a three-torch arrangement is necessary. The exact angular positioning of the torch is made at the holder. In machine cutting torch arrangements of the prior art, each torch with its respective feed houses is mounted in the holder rigidly by means of a two-part shell.

It is, however, necessary to exchange the nozzles fairly frequently. And during such an exchange, there often occur, in connection with the aforesaid two-part shells, disadvantageous changes in the angular position of the torch the nozzle of which is being exchanged. As a result of this adverse occurrence, time-consuming readjustment is necessary, which becomes prohibitive where several torches need to be adjusted to their respective angles after nozzle exchange.

SUMMARY OF THE INVENTION

The instant invention accordingly has among its principal objects to avoid the aforesaid drawbacks of the prior art.

It is a further object of the instant invention to provide for quick and easy release and, respectively, reinsertion, of the individual torches so that the nozzles can be changed while the torches are disconnected from the holding device.

It is another object of the invention to provide for releasable latching of each torch in the holding device.

Further objects and advantages of the invention will be set forth in part in the following specification and in part will be obvious therefrom without being specifically referred to, the same being realized and attained as pointed out in the claims hereof.

Broadly speaking, the foregoing objects are attained by provision of releasable latching means that protrude through a sleeve which surrounds the torch body in the torch-operating position and a recess formed in the torch body and which is engaged by the latch; permitting the torch to be quickly removed from the sleeve and rapidly replaced thereinto, for exchanging the nozzle of the torch body while the torch is out of engagement with the sleeve.

ADVANTAGES

The instant invention offers the advantage that the emplacement and, respectively, removal of the torch in the sleeve is simple and can be carried out quickly without, however, changing the angular position of the sleeve; thus making certain that upon reemplacement the torch with the new nozzle will have the same angular position that it has before it was removed from the sleeve.

BRIEF DESCRIPTION OF THE DRAWING

For a fuller understanding of the nature and object of the invention, reference should be had to the following detailed description, taken in connection with the accompanying drawings, in which the single FIGURE is an elevational view, partly in section, of a torch-holding latching arrangement in accordance with the invention.

DESCRIPTION OF THE PREFERRED EMBODIMENT

A torch pin is provided that comprises a torch body 11 and a nozzle 15 that is removably connected to the torch body 11, by means of a screw 12. Connections 14 and 15 are provided for the feeding of the gaseous substances for instance by means of flexible tubes (not shown).

The holding arrangement is generally indicated at 16 and includes four parts, 17, 18, 19 and 20, which are interconnected by means of screws 21, 22 and 23, respectively. In order to permit certain angular positioning of the torch 10, the part 20 is made movable relative to the part 19, and the part 18 is made movable relative to the part 17. These parts may be arrested in the desired position, by tightening the aforesaid screws 21 and 23.

A sleeve 24 is supported by the part 20. The sleeve 24 serves to receive the torch body 11 in a certain torch-engaging or operating position. Removal and replacement of the torch 10 relative to the sleeve 24 will result in the torch being returned to the same position in which it was before the removal.

For an exact reproduction of the aforesaid torch-operating position, the sleeve has near its lower portion an inwardly projecting flange 25 that serves as an abutment for a shoulder 26 that is provided on the body 11 of the torch 10. Furthermore, in order to prevent an exchange of the nozzle 13 while the torch 10 is mounted in the sleeve 24, the screw 12 is preferably disposed within the sleeve 24 when the torch 10 is in the torch-operating position.

To secure the torch 10 in its position relative to the holding arrangement 16, there is provided a latching means between the torch body 11 on the one hand and the holding arrangement 16 on the other. The latching means includes a latch or pin 29 that is biased resiliently by a spring 28, and which projects with its front section 30 through an opening in the sleeve 24 into the interior of the sleeve 24. The front section 30 carries a cam surface, which may be either cone shaped, as shown, or spherical, to facilitate each emplacement and removal, respectively, of the torch body 11 relative to the sleeve 24.

The latch 29 engages with its front section 30 a recess, such as a bore 31 in the torch body 11.

The pressure of the spring 28 is adjustable by means of a screw 32; and adjustment by this means of the spring pressure will at the same time adjust the engagement pressure exerted from the latch against the bore 31.

OPERATION

The operation of the above described embodiment of the invention is as follows. When it is desired to exchange the nozzle 13 of the torch body 11, the operator will remove the entire torch 11 from its emplacement in the sleeve 24, will then remove the nozzle 13 from the torch body 11, which removal will include manipulation of the screw 12; and will thereafter place a new nozzle 13 onto the torch body 11. Subsequently, the operator will reinsert the torch 10 into the sleeve until the shoulder 26 of the torch body 11 engages in abutment the inner flange 25 of the sleeve 24. In this position, the latch 30 will engage the bore 31, and will thus return the torch 10 to its previous torch engaging operating position, retaining the previous angular station of the torch 10.

Although some of the advantages have previously been alluded to, it may be useful to refer to the utter simplicity of removing the torch 10 from its emplacement and subsequently reemplacing it, thereby rendering it possible to exchange the nozzle 13 while the torch 10 is removed from the operating station. This avoids any changes of angular positioning that had been experienced with apparatus of the prior art.

If the operator finds that adjustment of the pressure of the spring 28 is needed, he will turn the screw 32 in order to carry out the desired adjustment.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a torch-holding arrangement, for one or more cutting torches, each torch including a body and at least one nozzle connected to said torch body, the combination comprising:

a holder for each torch, said holder including a plurality of jointed parts and means for arresting said parts at any cutting angle, a sleeve secured to an end part of said holder for releasably receiving said torch body, said sleeve including an inwardly projecting flange serving as an abutment for said torch body thereby defining a torch-engaging position wherein said nozzle protrudes from said sleeve, and latching means operative between said holder and said torch body for releasably latching said torch relative to said sleeve in said torch-engaging position.

2. In a torch-holding arrangement, as claimed in claim 1, and a screw connecting said nozzle to said torch body, said screw in the torch-engaging position being disposed inside said sleeve.

3. In a torch-holding arrangement, as claimed in claim 1, said latching means comprising a recess defined in said torch body, and a latch disposed in said end part of said holder and operable to project through said sleeve in a projecting position, said latch including a front section releasably engaging said recess when said latch is in the projecting position.

4. In a torch-holding arrangement, as claimed in claim 3, a spring resiliently biasing said latch into said projecting position.

5. In a torch-holding arrangement, as claimed in claim 4, an adjustment means operable for adjusting the force exerted by said spring onto said latch.

6. In a torch-holding arrangement, as claimed in claim 3, said front section being cone shaped.

* * * * *